(12) United States Patent
Darr et al.

(10) Patent No.: US 9,192,901 B2
(45) Date of Patent: Nov. 24, 2015

(54) CO-CURRENT MIXER, APPARATUS, REACTOR AND METHOD FOR PRECIPITATING NANOPARTICLES

(75) Inventors: Jawwad Darr, Milton Keynes (GB); Christopher James Tighe, Cambridge (GB); Robert Gruar, Wiltshire (GB)

(73) Assignee: UCL BUSINESS PLC, London (GB)

( * ) Notice: Subject to any disclaimer, the term of this patent is extended or adjusted under 35 U.S.C. 154(b) by 213 days.

(21) Appl. No.: 13/699,774

(22) PCT Filed: May 17, 2011

(86) PCT No.: PCT/GB2011/000750
§ 371 (c)(1),
(2), (4) Date: Feb. 5, 2013

(87) PCT Pub. No.: WO2011/148121
PCT Pub. Date: Dec. 1, 2011

(65) Prior Publication Data
US 2013/0136687 A1    May 30, 2013

(30) Foreign Application Priority Data

May 25, 2010 (GB) .................................. 1008721.1
Aug. 3, 2010 (GB) .................................. 1013063.1

(51) Int. Cl.
| | |
|---|---|
| *B01J 19/00* | (2006.01) |
| *B01J 8/00* | (2006.01) |
| *B01D 11/04* | (2006.01) |
| *B01F 5/04* | (2006.01) |
| *B01F 13/00* | (2006.01) |
| *B01J 3/00* | (2006.01) |
| *B01J 3/02* | (2006.01) |
| *B01F 5/00* | (2006.01) |
| *B82Y 99/00* | (2011.01) |

(52) U.S. Cl.
CPC ............. *B01J 8/005* (2013.01); *B01D 11/0411* (2013.01); *B01F 5/045* (2013.01); *B01F 13/0059* (2013.01); *B01J 3/008* (2013.01); *B01J 3/02* (2013.01); *B01J 19/0093* (2013.01); *B01F 2005/0034* (2013.01); *B01J 2219/00889* (2013.01); *B82Y 99/00* (2013.01)

(58) Field of Classification Search
None
See application file for complete search history.

(56) References Cited

U.S. PATENT DOCUMENTS

| | | | |
|---|---|---|---|
| 5,118,528 A * | 6/1992 | Fessi et al. | ............... 427/213.36 |
| 2006/0090697 A1 | 5/2006 | Teshima et al. | |

(Continued)

FOREIGN PATENT DOCUMENTS

| | | |
|---|---|---|
| EP | 1516896 | 3/2005 |
| EP | 1595597 | 11/2005 |
| JP | 2001321649 | 11/2001 |

(Continued)

OTHER PUBLICATIONS

Search Report from GB1008721.1, dated Sep. 24, 2010.

(Continued)

*Primary Examiner* — Steven Bos
(74) *Attorney, Agent, or Firm* — Dority & Manning, P.A.

(57) ABSTRACT

A high pressure tubular reactor for production of nanoparticles by precipitation has unidirectional fluid flows of precursor and supercritical water directed from inner and outer coaxial inlets to an outlet via a reaction zone immediately downstream of the inlets. The inner inlet is for supercritical fluid, and the outer inlet is for a precursor.

18 Claims, 8 Drawing Sheets

(56) References Cited

U.S. PATENT DOCUMENTS

2007/0206435 A1* 9/2007 Lester et al. ............... 366/150.1
2010/0022680 A1* 1/2010 Karnik et al. ................ 523/105

FOREIGN PATENT DOCUMENTS

| | | |
|---|---|---|
| JP | 2002292274 | 10/2002 |
| JP | 2004122107 | 4/2004 |
| WO | 2005058763 | 6/2005 |
| WO | 2005077505 | 8/2005 |
| WO | 2006051153 | 5/2006 |

OTHER PUBLICATIONS

International Search Report issued Sep. 13, 2011.

* cited by examiner

CO-CURRENT MIXER, APPARATUS, REACTOR AND METHOD FOR PRECIPITATING NANOPARTICLES

CROSS-REFERENCE TO RELATED APPLICATIONS

This application claims priority to International Application Serial No. PCT/GB2011/000750, filed May 17, 2011, which claims priority to GB Application No. 1008721.1 filed May 25, 2010, and GB Application No. 1013063.1, filed Aug. 3, 2010. International Application Serial No. PCT/GB2011/000750 is hereby incorporated herein for all purposes by this reference.

FIELD OF THE INVENTION

The present invention relates to a mixer for fluid materials, and particularly to a mixer suitable for rapidly combining an aqueous solution or suspension of solid particles (also referred to as a precursor) at room temperature with pure water at an elevated temperature and pressure, in a continuous hydrothermal process.

The present invention is suitable for continuous production of nanoparticles as an aqueous suspension.

BACKGROUND

The use of semi-continuous or continuous systems utilising different fluids (e.g. carbon dioxide) in their supercritical state have been extensively studied in relation to pharmaceutical and other fine particle formation. Continuous hydrothermal processes have been used to synthesize nano-scale fine particles (diameter typically <100 nm) including, but not restricted to: pure metals, metal oxides, metal chalcogenides or other ceramics, or intimate mixtures of one or more of these.

Specifically, the continuous hydrothermal process involves rapidly mixing purified water at an elevated temperature and pressure with an aqueous precursor at a lower temperature, to yield a combined stream at an intermediate temperature. Typically the resulting mixture is close to or above the critical point of the purified water (the critical temperature, $T_c=374°$ C.; critical pressure, $P_c=22.1$ MPa) to ensure that the reactions are rapid. This is achieved by heating the water to a temperature above $T_c$ at a pressure above $P_c$, whilst the precursor remains at close to room temperature.

Approaching the critical point, as the temperature of the purified water increases at constant pressure (e.g. 25 MPa), the solubility of a dissolved precursor decreases sharply. At the same time, the equilibrium reaction $H_2O=[H^+]+[OH^-]$ shifts to the right with increasing temperature. Thus, as the pure water and aqueous solution are mixed, many nanoparticles are formed by rapid nucleation, owing to the formation of a highly supersaturated mixture. The formation of metal oxides in this chemical environment is thought to occur by a mechanism of hydrolysis followed by rapid dehydration, owing to the excess of [OH"] and [H⁺] ions. The formation of an oxide of a metal M from the complex salt $ML_x$ (where L can be a nitrate or acetate anion for example) may be written as: Hydrolysis:

$$ML_x + xOH'' \rightarrow M(OH)_x + xL'', \quad (1)$$

$$\text{Dehydration: } M(OH)_x \rightarrow MO_{x/2} + (x/2)H_2O. \quad (2)$$

The density of pure water also decreases rapidly as it is heated to above the critical point at constant pressure. Thus, significantly, the densities of the aqueous precursor may be many times higher (typically up to ten-fold) than the supercritical water. Consequently, the problem of ensuring the rapid and intimate mixing of the two streams with widely differing densities is not a trivial one, because such differences tend to inhibit mixing.

A known mixing device comprises a simple 'tee' shaped tubular fitting inside which directly opposing or orthogonal flows of an aqueous precursor and supercritical water are brought into contact. Ideally, the nanoparticles are continually formed at the tube junction such that it is carried away as an aqueous slurry via the third branch of the 'tee'. However, owing to complex flow patterns arising from differences in density (i.e. buoyancy driven flow) it is not easy to control the precise location where precipitation occurs in such an arrangement, and moreover the location may not be stable as the reaction proceeds. Accordingly, it is not uncommon for undesirable blockages to occur in the tubular fitting, prohibiting the running of the apparatus for an extended period. EP-A-1713569 describes the limitations of 'Tee' and 'Y' shaped reactors.

Blockages are a considerable hindrance to the manufacture of nanoparticles, and in fact the resulting obstruction of the flow is highly dangerous due to the very high mixer pressures of ca. 25 MPa.

EP-A-1713569 proposes a solution to the blockage of reactors, and provides a counter-current mixing reactor whereby opposed streams of precursor and supercritical water are brought together, and the outflow of suspended nanoparticles is around one of the inlets to the reactor; a heater is provided around the outlet. This arrangement is said to avoid pre-mixing or stagnation, thus, minimizing blockage of the reactor or the pipework associated therewith.

Continuous hydrothermal systems are currently used to synthesise a variety of nanomaterials, however, several materials have emerged as being improved by synthesis in continuous hydrothermal systems. Nano-sized ZnO is an example of a material that has received a lot of attention in the continuous hydrothermal literature and has been synthesised using a variety of reaction point geometries, precursors and reaction conditions. The reaction mechanisms governing the formation of ZnO in continuous systems are well understood. The effects of processing parameters are also known in conjunction with the crystallinity, morphology and yield of the material. Nanosized ZnO is useful in many applications such as sunscreens, paints, varnishes, plastics, cosmetics and broad UV-A and UV-B attenuation agents.

Hydroxyaparite (HA) is an example of a solid non-metal nano-material synthesised using continuous hydrothermal methods. The crystallization through rapid heating of a co-precipitate, formed by mixing of calcium nitrate and diammonium hydrogen phosphate in a basic environment, is thought to yield a nano-sized product (in at least one dimension. Hydroxyaparite is used in many applications, inert biological coatings and hard tissue replacements being amongst the most prevalent.

BRIEF SUMMARY OF THE INVENTION

According to the present invention there is provided a co-current mixer for production of nanoparticles by precipitation, and comprising a first inlet, a second inlet, and an outlet, the first inlet being within the second inlet and defining a mouth, the first and second inlets facing said outlet and defining a mixing zone downstream of said mouth and upstream of said outlet. The invention may also be characterized by apparatus for precipitation of nanoparticles under high pressure, and having a tubular mixing zone defining a through flow direction for fluids, an outlet at the downstream end of said zone, and inner and outer inlets at the upstream end of said zone, said inner and outer inlets being one inside the other and adapted to direct respective inlet flows of fluid substantially in said through flow direction.

In a further characterization, the invention comprises a high pressure tubular reactor for production of nanoparticles in which in use, unidirectional fluid flows of aqueous precursor and supercritical water are directed from coaxial inlets to an outlet via a mixing zone immediately downstream of said inlets.

Other continuous solvothermal applications which may benefit from this invention include: (i) reactions involving mixtures containing water and/or other solvents (e.g. ethanol) near to or above the critical point of the mixture, and (ii) the degradation (e.g. by oxidation) by supercritical water of streams containing either organic or inorganic substances dissolved or suspended in a liquid. In the first case, a small proportion of a co-solvent, typically up to 10% by volume is added to the water stream; in one embodiment 5% ethanol is added. In the second case oxidization may result in a particulate residue. However, in the preferred application described henceforth the mixer is used to generate nanoparticles in a continuous hydrothermal process.

As noted above, the supercritical water flow may include a small proportion of a co-solvent or a co-reagent, such as ethanol. The precursor may be intentionally selected for production of nanoparticles, but may also comprise an effluent stream whereby the reaction produces dissolved gases (e.g. carbon dioxide and nitrogen) and particulate waste within a substantially non-contaminated liquid carrier outlet flow. The particulate waste may be removed by conventional filtration techniques.

The mixer of the invention results in a temperature at the mixing zone approaching closely the maximum theoretically achievable for given conditions of temperature, pressure and flow rate of the inlet streams; thus the risk, of producing undesirable large particles and agglomeration is reduced, faster rates of reaction and thus higher yields are achievable and the production of high-temperature crystalline phases is made possible. In a preferred embodiment two inlets are provided for precursor, and one for supercritical water. Such an arrangement has a reduced risk of blockage since both inlet flows are towards the outlet, and thus no change of direction of the inlet fluids are required downstream of the initial meeting point.

Moreover, unlike prior art mixers, the net cross-sectional area of the inlets can be approximately equal to the cross-sectional area of the outlet, which avoids potential stagnation due to restrictions to the flow. Thus the outer inlet and the outlet may be defined by a tube of substantially constant diameter into which is introduced a second tube defining a single inner inlet and terminating at an open mouth facing the flow direction.

The invention substantially avoids the risk of stagnant regions or dead zones downstream of the mixing zone, as it carries the products away from the precursors and the supercritical water feed.

In a preferred embodiment the first and second inlets are co-axial, and thus define immediately upstream of the mixing zone a circular inner inlet and an annular outer inlet. The inner inlet may comprise a tube end orthogonal to the flow direction. In a preferred embodiment the direction of flows from the inlets oppose the effect of gravity, and are thus substantially upward.

Preferably the first and second inlets are co-extensive for a minimal dimension in the flow direction, it being sufficient to ensure flow of both input streams toward the outlet. Such an arrangement minimizes the potential for heat transfer between the inlets, and thus the risk of premature precipitation. The inner inlet may be insulated to restrict heat transfer; for example an inner inlet pipe may have an insulating coating on the exterior thereof. All the heat transferred between the inlets flows towards the outlet; thus the average temperature measured at the outlet approaches closely the maximum theoretically achievable for given conditions of temperature, pressure and flow rate of the inlet streams. The extent of insulating coating is to some extent dependent on flow rate of the precursor. For high flow rates, heating of the precursor by the supercritical water stream is not significant. For low flow rates, an insulating coating is beneficial in avoiding significant pre-heating of the precursor (or cooling of the supercritical flow). The skilled man will be able to select suitable coating, and may also specify the respective cross-sectional areas to minimise the surface area available for heat transfer.

In a preferred embodiment, the inner inlet is straight upstream of the mouth thereof and the outer inlet has an inlet duct at the side thereof, and preferably orthogonal thereto, so as to minimize the co-extensive portion in the flow direction. More than one inlet duct may be provided at the side of the outer inlet, and it will be understood that as more such ducts are provided around the inner inlet, the dimension of the coextensive portion will be further reduced. The outlet inlet may for example be connected to two opposed inlet ducts, but also a circular inlet duct could be provided as an annulus completely or substantially surrounding the inner inlet.

In the preferred embodiment, the inner and outer inlets have co-extensive fluid flow in the flow direction for a distance equal to or less than the greatest transverse dimension of the outer inlet.

Thus in a preferred arrangement the mixer is formed from ¼" (6.35 mm) bore stainless steel components, and the co-extensive fluid flow dimension in the flow direction is in the range 0.001-5.00 mm. These dimensions may be increased as required to accommodate substantially larger inlet flow rates (such as that on an industrial scale).

The mixer should be capable of withstanding the reaction pressures necessary to exceed the critical pressure of the water inlet flow, which is of the order of 25 MPa; selection of suitable materials and joints is within the ordinary ability of a suitably skilled person. In a preferred embodiment, the inner and outer inlets are defined by co-axial tubes, preferably both of circular cross-section. The outer inlet and outlet may be constituted by a single tube defining the mixing zone therebetween, and the single tube is preferably of constant cross-sectional area and shape. The single tube which defines the mixing zone is preferably straight between the inlet and the outlet.

In the case of co-axial inner and outer inlet tubes, the mouth of the inner inlet tube is preferably perpendicular to the flow direction and circular. The invention also provides a method of precipitating nanoparticles by mixture of an aqueous precursor and supercritical water, and comprising the steps of: providing a first fluid flow of precursor in a flow direction from an inlet to an outlet, and providing a second fluid flow of supercritical steam into said first fluid flow substantially in said direction between said inlet and outlet, a mixing zone being created downstream of exit of said second fluid flow and upstream of said outlet.

Such a method provides generally unidirectional flow of inlet streams and outlet stream, and said unidirectional flow is preferably straight between said inlets and outlet.

Preferably the method provides for the second fluid flow to be introduced substantially into the middle of said first fluid flow. In a preferred embodiment the method provides for the first fluid flow to be introduced substantially radially of said flow direction just upstream of said mixing zone, so that the first fluid flow turns to the flow direction before introduction of the second fluid flow.

Nanoparticles are produced in the mixing zone of the invention, and continue to grow in size until the reaction terminates or the base materials are exhausted. A consistent narrow band of particle size is however desirable in order to minimize sorting and grading of the outlet flow.

A further desirable feature would be to modify the surface of nanoparticles in order to provide, for example, a coating or capping. Such surface modification is useful in stabilizing nanoparticles, and finds particular application in the formulation of suspensions such as inks.

According to a further aspect of the present invention, a third inlet is provided in the outflow of said first and second inlets whereby a fluid may be introduced into said outflow in order to modify the characteristics thereof. The fluid introduced via the third inlet may for example be a quenching and/or a capping agent.

In one preferred embodiment, the third inlet is in opposition to the outflow and is coaxial within the outflow stream. The third inlet may for example be constituted by a tubular duct, typically in the form of a stainless steel pipe of the kind described above. In this arrangement a second mixing zone is created in the vicinity of the mouth of the third inlet, and the combined fluid flows through an annulus around the third inlet to an outlet. The direction of the outflow is substantially unchanged.

In an embodiment of the invention the mouth of the third inlet may be adjustable along the outflow axis toward and away from the first and second inlets, and the first, second and third inlets may be co-axial.

The method of the invention may include the further step of providing a third flow in the outflow of said first and second fluid flow, preferably in opposition to said outflow. The third flow is preferably introduced substantially into the middle of said outflow whereby a second mixing zone is formed. This further aspect of the invention may be used to add a quenching agent, for example water, to the outflow of suspended nanoparticles whereby the temperature of this outflow is reduced below that at which nanoparticles continue to grow. The arrangement thus permits the size range of nanoparticles to be limited. In a further step of the method of the invention, the third flow is adjusted to cause cessation of growth of nanoparticles at a pre-determined particle size. Such adjustment may be by alteration of flow volume, pressure and/or temperature, or by physical movement of the means by which the third flow is introduced, for example by moving the mouth of a third inlet toward and away from the first and second inlets.

This further aspect of the invention may also be used to add a capping or coating agent to the nanoparticles, for example to obtain a functional surface treatment. Thus the method includes the step of introducing via said third flow a chemical agent whereby nanoparticles in the outflow are modified.

The quenching and chemical treatment aspects may be combined so that nanoparticles in the outflow are both of a desired size range and have a desired constitution. This feature of the invention may reduce the number of processing steps which are required to synthesize functionalized nanomaterials.

BRIEF DESCRIPTION OF THE DRAWINGS

Other features of the invention will be apparent from the following description of several preferred embodiments described by way of example only with reference to the accompanying drawings in which:

FIGS. 13 and 1 show typical particle size distribution from the outflow of the mixer of FIG. 12. Tables 1-3 show experimental results for selected geometries of a 'Tee' shaped mixer according to the invention.

DESCRIPTION OF EXEMPLARY EMBODIMENTS OF THE INVENTION

Figure 1:
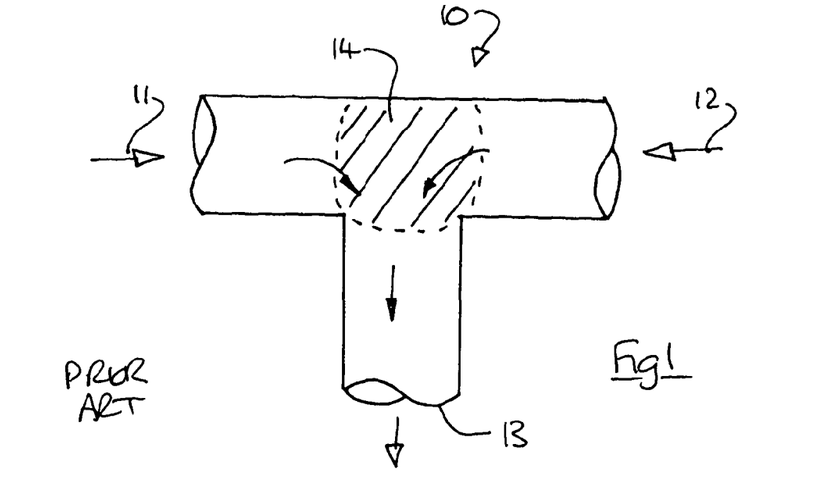
FIG. 1 illustrates a prior art 'Tee' shaped mixer.

FIG. 1 illustrates a conventional 'Tee' shaped mixer (10) in which a flow precursor (1 1), typically a metal salt solution opposes a counterflow of supercritical water (12). The respective flows meet at a mixing zone (14) in the vicinity of the 'T' junction, and flow out at right angles to an outlet (13), as indicated by the arrows.

Under ideal conditions, the reaction of the inlet flows causes precipitation and growth of nanoparticles in the mixing zone, and the outlet flow comprises an aqueous suspension of nanoparticles from which the solids are subsequently separated for further processing.

In the mixer of FIG. 1, the precise location of precipitation is difficult to control, with the result that the mixing zone may migrate towards the precursor source. In these circumstances nanoparticles will be precipitated in the precursor inlet tract, and a blockage will typically occur as the mass flow of precursor reduces. As a consequence the reaction must be stopped, and the equipment dismantled for cleaning or replacement, Blockage may also occur due to low flow rates, and instability of the reaction.

The very high pressures (ca. 25 MPa) require careful assembly and testing of the mixer prior to use, so that each blockage is a considerable disruption to production.

Figure 2:
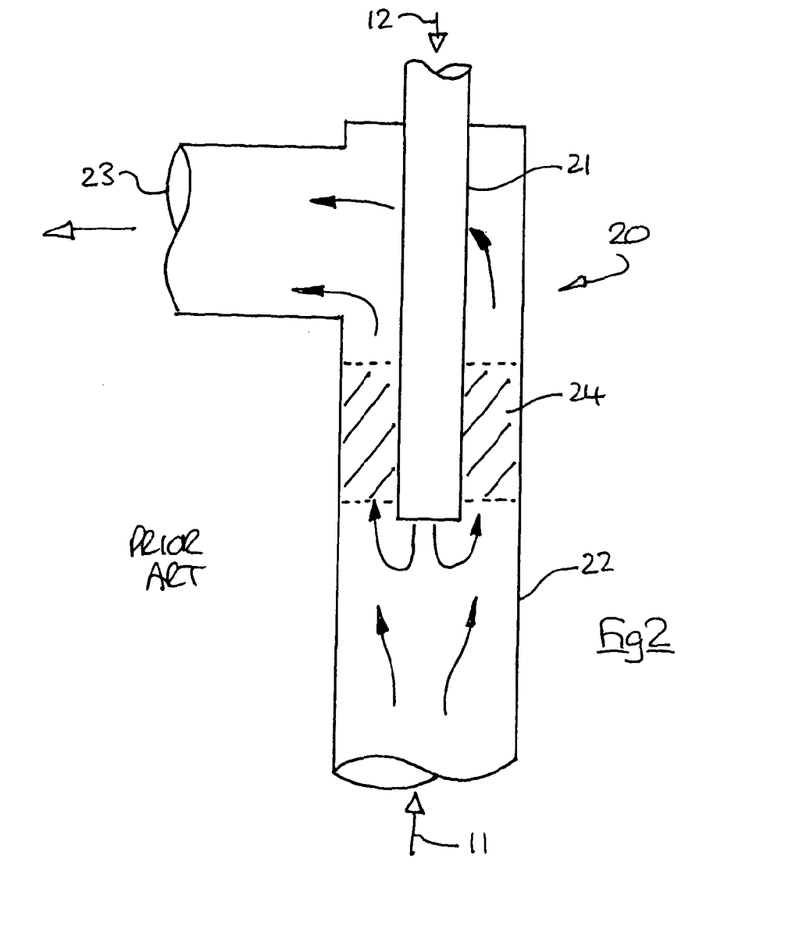
FIG. 2 illustrates a prior art counterflow mixer.

FIG. 2 illustrates an alternative mixer (20) described in EP-A-1713569. In this arrangement a co-axial arrangement of inlet tubes (21, 22) allow opposed flows of precursor (1 1) and supercritical water (12) to meet at the outlet of the inner inlet tube (21). The flow of supercritical water reverses in direction, and is swept into the annulus surrounding the inlet tube (21) where a mixing zone (24) is formed. As with the reactor of FIG. 1, an aqueous suspension of nanoparticles is formed, and flows orthogonally out of the mixer to an outlet (23) where it is collected for further processing. The arrangement of FIG. 2 is said to reduce or eliminate the risk of blockage by removing the potential for mixing to occur in the inlet tubes.

Heat transfer between the two inlet branches or between the inlet and outlet branch should be minimized so as to avoid premature precipitation of nanoparticles. Both prior proposals require a change of direction of one or both of the inlet flows. Furthermore, the prior reactors can be characterized by collision of opposed inlet flows so that the position of the leading edge of the mixing zone may be somewhat uncertain. In order to improve the quality and consistency of the production of nanoparticles it would be desirable to devise an improved mixer with better flow characteristics and hence reduced risk of variability.

Figure 3:
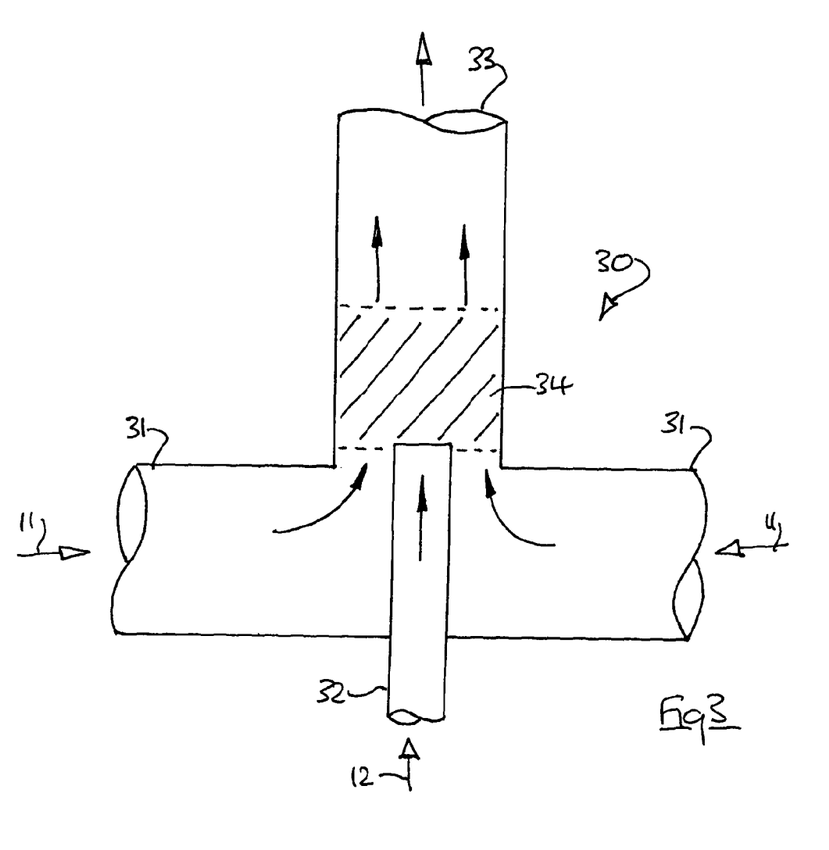
FIG. 3 illustrates schematically a mixer according to the present invention.

FIG. 3 shows in schematic form a mixer according to the present invention. A generally 'Tee' shaped reactor (30) has opposed inlets (31) each fed with a fluid flow of precursor (1 1). The precursor flow exits orthogonally via the third branch of the 'Tee', which defines an outlet (33). A second inlet (32), for supercritical steam enters the 'Tee' at the junction and passes coaxially to the mouth of the third branch, which defines the outlet (33). The second inlet terminates at the entrance to the third branch, or may enter within the branch as illustrated in FIG. 3. The arrangement ensures that co-axial flows of precursor and supercritical water enter a mixing zone (34) downstream of the inlet, in which nanoparticles are precipitated and swept to the outlet (33) for further processing. The second inlet may be insulated against heat transfer through the wall thereof, for example by an externally applied coating of any suitable kind. The third branch is a straight circular tube, and accordingly the sum of the flow areas at the entrance to the mixing zone is substantially equal to the flow area at the exit from the mixing zone.

Figure 4:
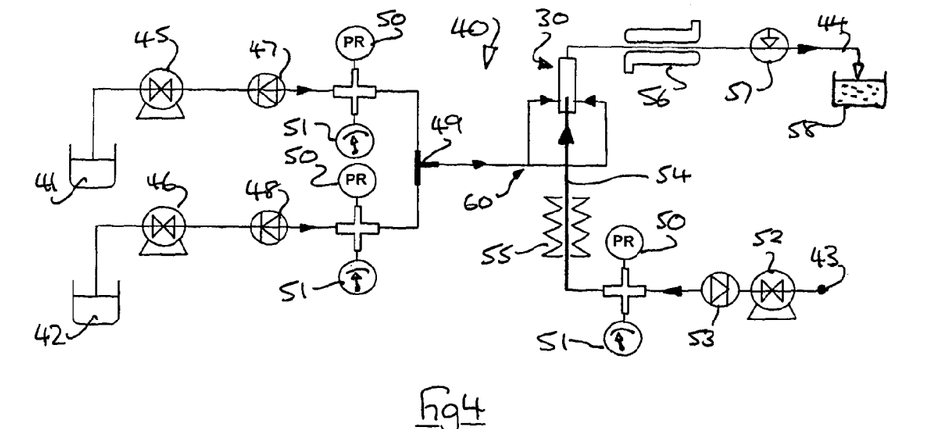
FIG. 4 illustrates schematically a flow path of constituents for production of nanomaterials according to the invention.

Accordingly in this particular embodiment there are no immediate restrictions to flow which might induce stagnation and blockage. FIG. 4 illustrates one arrangement suitable for producing nanoparticles from a precursor and water, and incorporating the co-current mixer of FIG. 3.

The system (40) comprises two precursor feedstocks (41, 42), a water inlet (43) and an outlet (44) for the particulate slurry containing nanoparticles.

Each feedstock (41) is fed from a supply tank via a respective high pressure pump (45, 46) and non-return valve (47, 48) to a 'Tee' piece (49) where the flows are joined. For each feedstock supply conduit, a pressure regulator (50) and pressure gauge (51) are provided.

The water inlet feeds water via a high pressure pump (52), and non-return valve (53) to an inlet conduit (54) having a pre-heater (55). Respective pressure regulator (50) and pressure gauge (51) are also provided. The mixer (30) is of the form illustrated in FIG. 3, and it will be observed that a central flow of supercritical water is joined from either side by a flow of precursor which is a desirable combination of the precursor feedstocks (41 & 42), which are themselves mixed at the upstream 'Tee' piece (49). The outlet from the mixer (30) passes via a cooler (56) and back pressure regulator (57) for further processing. For example the resulting suspension may be collected in a tank (58) for subsequent drying and grading.

in apparatus of FIG. 4, the precursor solution is formed from a metal salt solution and a base solution. Other additions may be required for certain reactions. The means and methods of forming a suitable precursor to the mixer (30) will be well-known to the skilled man, and need not be further described here.

Furthermore, the apparatus, apart from the mixer (30), is conventional. Pumps capable of generating a suitably high pressure are manufactured by Gilson™, and typically the mixer and associated conduits are made of 316 stainless steel. Preheating of the water supply was by a conduit coiled about an aluminum block, heated internally by an electrical heating rod and externally by a band heater (both supplied by Watlow). The system pressure was maintained at 24.1 MPa by a back-pressure regulator (Tescom model 26-1762-24-194).

The mixing processes and chemistry for the production of certain nanomaterials is now described, with some examples of temperature profile measurements and reactions carried out in a mixer of the type illustrated in FIG. 3.

Experimental Methods

Temperature Profile Measurements

Measurements of temperature profiles within the co-current mixer of FIG. 3 may be used to rapidly infer the quality of mixing and thus it's suitability for the production of nanoparticles; the temperature profiles were determined by placing J-type thermocouples (0.5 mm OD) in the flow at various positions between the outer inlet and outlet. A thermocouple feed-through fitting (Spectite MF series) located downstream of the cooler was used to allow measurement at high temperatures and pressures. Measurements were made at different flow rates of the inner and outer inlets and employing two different geometries of Swagelok 316 stainless steel tubing and fittings: 1) an inner inlet of ¹⁄₁₆" OD (outside diameter) and outlet of ¼" OD and 2) an inner inlet of ⅛" OD and outlet of ¼" OD. Due to the significant changes in density occurring inside the mixer, the quoted volumetric flow rates are referred to the density of water at 15° C. and 0.1 MPa. Four simultaneous measurements were taken per experimental run and the positions were adjusted for subsequent experiments. The point at a level with the outlet of the inner pipe is defined as the zero datum (0 mm) and positive distances are in the direction of flow. The thermocouple placement within the evaluated system was no more accurate than ±2 mm. Both the inner and outer inlets were composed of pure water for these experiments; the use of internal thermocouples was not possible during the synthesis of nanoparticles as blockages resulted from the accumulation of particles on the exteriors of the thermocouples.

Figure 5:
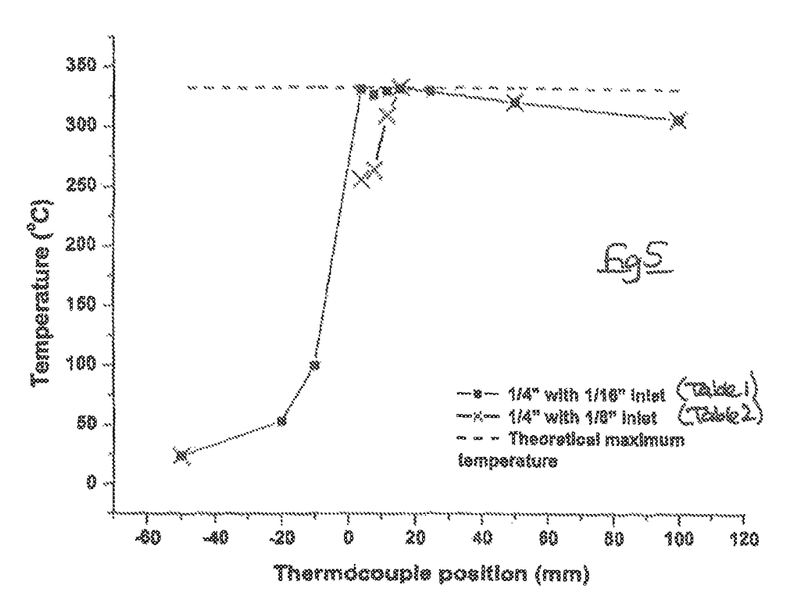
FIG. 5 shows comparative temperature profiles measured between the outer inlet and outlet.

FIG. 5 illustrates the position of thermocouples on either side of datum for the two geometries noted above; the values recorded at each of the geometries are given in Tables 1 and 2.

TABLE 1

Reaction point geometry (¹⁄₁₆" OD inner pipe with ¼" OD outer lube)

| Thermocouple position (mm) | 350° C. Flow rate (hot: precursor) mL min⁻¹ (ref 15° C. 0.1 MPa) | | | | 400° C. Flow rate (hot: precursor) mL min⁻¹ (ref 15° C. 0.1 MPa) | | | | 450° C. Flow rate (hot: precursor) mL min⁻¹ (ref 15° C. 0.1 MPa) | | | |
|---|---|---|---|---|---|---|---|---|---|---|---|---|
| | 20:20 | 15:15 | 10:10 | 25:10 | 20:20 | 15:15 | 10:10 | 25:10 | 20:20 | 15:15 | 10:10 | 25:10 |
| −50 | 24 | 24 | 24 | 24 | 24 | 24 | 24 | 24 | 24 | 24 | 24 | 24 |
| −20 | 39.1 | 42 | 52.6 | 66 | 50.8 | 62.1 | 86.9 | 79.9 | 53.3 | 64.5 | 87.3 | 97.6 |
| −10 | 63.4 | 70.6 | 88.4 | 116 | 93 | 115 | 114 | 142 | 100 | 120 | 148 | 161 |
| 4 | 195 | 194 | 189 | 258 | 303 | 293 | 290 | 354 | 332 | 324 | 324 | 380 |
| 8 | 198 | 192 | 188 | 257 | 303 | 292 | 290 | 358 | 327 | 322 | 324 | 380 |
| 12 | 198 | 190 | 189 | 258 | 302 | 291 | 250 | 358 | 330 | 323 | 322 | 380 |

TABLE 1-continued

Reaction point geometry (1/16" OD inner pipe with 1/4" OD outer lube)

| Themocouple position (mm) | 350° C. Flow rate (hot: precursor) mL min$^{-1}$ (ref 15° C. 0.1 MPa) | | | | 400° C. Flow rate (hot: precursor) mL min$^{-1}$ (ref 15° C. 0.1 MPa) | | | | 450° C. Flow rate (hot: precursor) mL min$^{-1}$ (ref 15° C. 0.1 MPa) | | | |
|---|---|---|---|---|---|---|---|---|---|---|---|---|
| | 20:20 | 15:15 | 10:10 | 25:10 | 20:20 | 15:15 | 10:10 | 25:10 | 20:20 | 15:15 | 10:10 | 25:10 |
| 16 | 196 | 189 | 188 | 257 | 303 | 293 | 251 | 356 | 332 | 324 | 323 | 380 |
| 25 | 197 | 187 | 189 | 258 | 272 | 294 | 295 | 360 | 330 | 325 | 328 | 374 |
| 50 | 194 | 190 | 180 | 253 | 299 | 295 | 292 | 358 | 321 | 316 | 305 | 370 |
| 100 | 192 | 183 | 175 | 250 | 293 | 290 | 283 | 350 | 308 | 311 | 291 | 370 |
| Theoretical max | 203 | 203 | 203 | 273 | 309 | 309 | 309 | 377 | 338 | 338 | 338 | 382 |

TABLE 2

Reaction point geometry (1/8" OD inner pipe with 1/4" OD outer tube)

| Themocouple position (mm) | 350° C. Flow rate (hot:precursor) mL min$^{-1}$ (ref. 15° C., 0.1 MPa) | | | | 400° C. Flow rate (hot:precursor) mL min$^{-1}$ (ref. 15° C., 0.1 MPa) | | | | 450° C. Flow rate (hot:precursor) mL min$^{-1}$ (ref. 15° C., 0.1 MPa) | | | |
|---|---|---|---|---|---|---|---|---|---|---|---|---|
| | 20:20 | 15:15 | 10:10 | 25:10 | 20:20 | 15:15 | 10:10 | 25:10 | 20:20 | 15:15 | 10:10 | 25:10 |
| −50 | 24 | 24 | 24 | 24 | 24 | 24 | 24 | 24 | 24 | 24 | 24 | 24 |
| 4 | 168 | 169 | 166 | 223 | 242 | 264 | 261 | 315 | 257 | 276 | 285 | 313 |
| 8 | 170 | 173 | 169 | 228 | 248 | 270 | 269 | 323 | 264 | 284 | 290 | 323 |
| 12 | 189 | 186 | 182 | 255 | 283 | 301 | 283 | 373 | 310 | 323 | 330 | 378 |
| 16 | 201 | 194 | 185 | 258 | 298 | 311 | 294 | 374 | 333 | 330 | 332 | 379 |
| 50 | 194 | 190 | 180 | 253 | 299 | 295 | 292 | 358 | 321 | 316 | 305 | 370 |
| 100 | 192 | 183 | 175 | 250 | 293 | 290 | 283 | 350 | 308 | 311 | 291 | 370 |
| Theoretical max | 203 | 203 | 203 | 273 | 309 | 309 | 309 | 377 | 338 | 338 | 338 | 382 |

Materials

All the water used in the experiments (i.e. to produce supercritical water and to prepare the precursors) was produced by the micro filtration and de-ionisation of mains water using a commercial water treatment unit (Millipore Elix 5). The measured resistivity of the treated water was >10 MΩ cm$^{-1}$.

Diammonium hydrogen phosphate [$(NH_4)_2HPO_4$, 98.3%] and calcium nitrate tetrahydrate [$Ca(NO_3)_2 \cdot 4H_2O$, 99.0%] were obtained from Sigma-Aldrich (UK). Ammonium hydroxide solution ($NH_4OH$, 30% w/w) was obtained from VWR International (UK). Diammonium hydrogen phosphate solution (0.05 M) and calcium nitrate solutions (0.10 M) were used in the synthesis of hydroxyapatite samples (Ca:P molar ratio: 2.0). The pH of both the solutions prior to the reaction was kept above pH 10 by addition of Ammonium hydroxide solution. 1.0 ml and 12.0 ml of ammonium hydroxide were added to 500 ml of calcium nitrate and diammonium hydrogen phosphate solutions, respectively. Zinc nitrate ($Zn(NO_3)_2 \cdot 6H_2O$) and potassium hydroxide (KOH) were obtained from Sigma-Aldrich (UK). Zinc nitrate hexahydrate (0.2 M) and potassium hydroxide (0.2 M) aqueous solutions were used in the synthesis of all zinc oxide samples.

Materials Synthesis

All experiments were conducted using a continuous hydrothermal flow synthesis (CHFS) apparatus of the type illustrated in FIG. 3 in a circuit as illustrated in FIG. 4. The mixer, tubing, and components were all made of 316 stainless steel (supplied by Swagelok). The solutions were pumped at various flow rates through the continuous hydrothermal system.

In the hydrothermal process of the examples, the precursor solutions (41, 42) of either Calcium nitrate and di-ammonium hydrogen phosphate (pH adjusted to 10 with $NH_4OH$) or zinc nitrate and potassium hydroxide were pumped to mix in a stainless steel Swagelok 1/8" "Tee" piece (49) approximately 12 cm below the point of contact with the superheated water. A second 1/8" "Tee" piece 60 was provided approximately 2 cm downstream of the first to split the pre-mixed precursor stream for entry via inlets (31) into either side of the reaction point. The pre-heated water feed was then brought into contact with these premixed precursor solutions under different flow regimes (see Table 3). Nanoparticles produced from two different diameters of the inner inlet were evaluated: 1) an inner inlet of 1/16" OD and outlet of 1/4" OD and 2) an inner inlet of 1/8" OD and outlet of [1/4]" OD, as noted above.

TABLE 3

| Material | Plot No. | Inner pipe OD | Outer pipe OD | Precursor concentration (M) | Auxillary feed (M) | Pump flow rates (mL min$^{-1}$) | | | Supercritical water temperature (° C.) | Reaction yield (%) |
|---|---|---|---|---|---|---|---|---|---|---|
| | | | | | | Water | Pre | Aux | | |
| HA | i | 1/16" | 1/4" | 0.1$^a$ | 0.05$^b$ | 20 | 10 | 10 | 450 | 84 |
| HA | ii | 1/16" | 1/4" | 0.1$^a$ | 0.05$^b$ | 10 | 5 | 5 | 450 | 80 |
| HA | iii | 1/8" | 1/4" | 0.1$^a$ | 0.05$^b$ | 20 | 10 | 10 | 450 | 83 |
| HA | iv | 1/8" | 1/4" | 0.1$^a$ | 0.05$^b$ | 10 | 5 | 5 | 450 | 84 |
| ZnO | i | 1/16" | 1/4" | 0.1$^c$ | 0.2$^d$ | 20 | 10 | 10 | 450 | 86 |

TABLE 3-continued

| Material | Plot No. | Inner pipe OD | Outer pipe OD | Precursor concentration (M) | Auxillary feed (M) | Pump flow rates (mL min$^{-1}$) Water | Pump flow rates (mL min$^{-1}$) Pre | Pump flow rates (mL min$^{-1}$) Aux | Supercritical water temperature (° C.) | Reaction yield (%) |
|---|---|---|---|---|---|---|---|---|---|---|
| ZnO | ii | 1/16" | 1/4" | 0.1$^c$ | 0.2$^d$ | 10 | 5 | 5 | 450 | 84 |
| ZnO | iii | 1/8" | 1/4" | 0.1$^c$ | 0.2$^d$ | 20 | 10 | 10 | 450 | 82 |
| ZnO | iv | 1/8" | 1/4" | 0.1$^c$ | 0.2$^d$ | 10 | 5 | 5 | 450 | 86 |

$^a$calcium nitrate, $^b$diammonium hydrogen phosphate, $^c$zinc nitrate hexahydrate, $^d$potassium hydroxide Characterisation of Materials Freeze-dried samples of the materials were used for characterisation. Freeze-drying was performed using a Virtis Genesis 35XL freeze dryer. The drying cycle lasted 22.5 hours at a vacuum of <100 millitorr, the samples were initially frozen to −40° C. and gradually warmed to 25° C., whilst the condensing apparatus was constantly maintained at −60° C.

Powder X-Ray Diffraction

XRD patters were collected on a Bruker D4 diffractometer using Cu-Ka radiation (λ=0.15418 nm) over the 2θ range 10-80° with a step size of 0.02° and a count time of 1 s.

Transmission Electron Microscopy

A JEOL 100 keV equipped with a Tungsten filament electron gun operated at 100 keV was used for the generation of electron micrographs. Particle size distributions were determined from these images using freely available software (Image J).

Results

Temperature Profile Measurements

Tables 1 and 2 show the measured temperature profiles in co-current mixers with an inner pipe of 1/16" or 1/8" OD, respectively. The maximum theoretical temperature was determined by enthalpy balance, using the well known thermochemical properties of pure water.

Measurements of the temperature profiles (not shown in Tables 1 or 2) were also made inside mixers in which the inner pipe was below the inlet of the precursor; in this case it was found that the supercritical water flowed back along the precursor conduit and was thus unsuitable for the precipitation of nanoparticles.

FIG. 5 is a typical plot of the measurements in Tables 1 and 2 for a supercritical water temperature of 450° C. and flow rate of 20 ml min$^{-1}$; the flow rate of the precursor was also 20 ml min$^{-1}$. The effect of the exchange of heat through the wall of the inner pipe is evident in FIG. 5 by the heating of the precursor below the outlet of the inner pipe.

The temperature in the mixing zone above the inner pipe of 1/16" OD rapidly approaches the theoretical maximum, within a distance of 4 mm from the outlet of the inner pipe, indicating that the mixing is complete at this point. The theoretical maximum is approached less rapidly using an inner pipe of 1/8" OD (within 16 mm of the outlet of the inner pipe) indicating that mixing occurs more slowly. It is believed that the physical process of mixing may be the result of the entrainment of the precursor into the trailing edge of a jet of supercritical water issuing from the outlet of the inner pipe. The rate of entrainment is proportional to the velocity of the jet; consequently, the use of a 1/16" inner pipe results in a velocity four-fold higher than the 1/8" inner pipe and thus more rapid entrainment and mixing. Moving downstream of the mixing zone, the fall in temperature evident in FIG. 5 is due to heat losses from the outer tube; this of course may be prevented by more effective insulation of the outer tube, Comparison of Materials Synthesised in Different Reaction Point Geometries Table 3 shows the conditions used in each reaction along with the reaction yield as a percentage of theoretical maximum yield, by mass. Note that ZnO required a supercritical water temperature of over about 425° C. for precipitation to occur.

Figure 6:
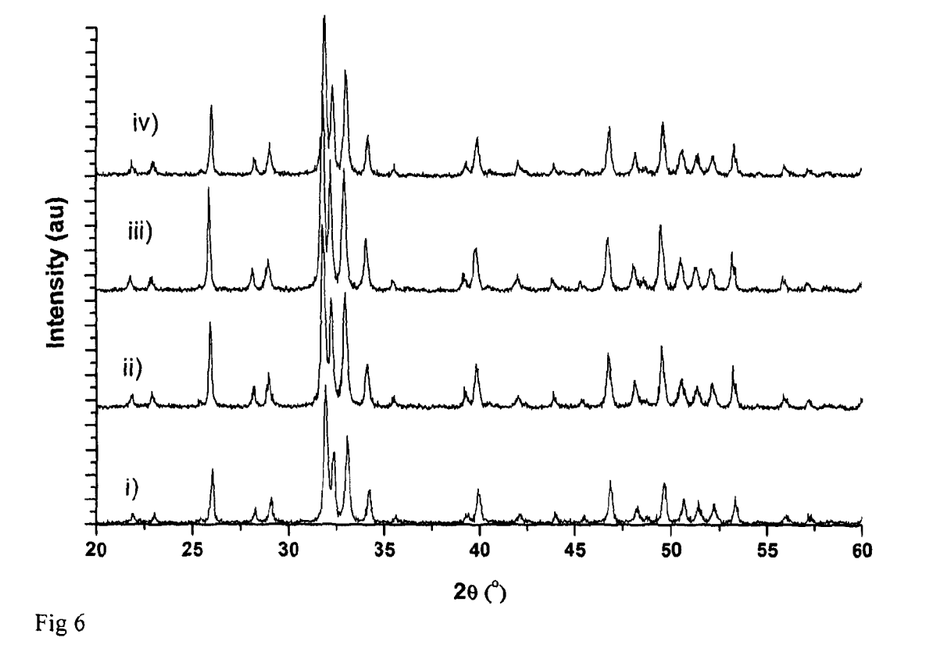
FIGS. 6 & 7 show powder x-ray diffraction (XRD) patterns of two example reactions.

Nanopowders obtained using the different co-current mixer geometries were characterised by several methods for crystallinity and phase identification. FIG. 6 shows the powder XRD patterns of the samples of HA prepared under the conditions given in Table 3. All show good agreement with JCPDS pattern 09-0432 [(I)-Hydroxyapatite, syn-Ca$_5$(PO$_4$)$_3$(OH)].

Figure 7:
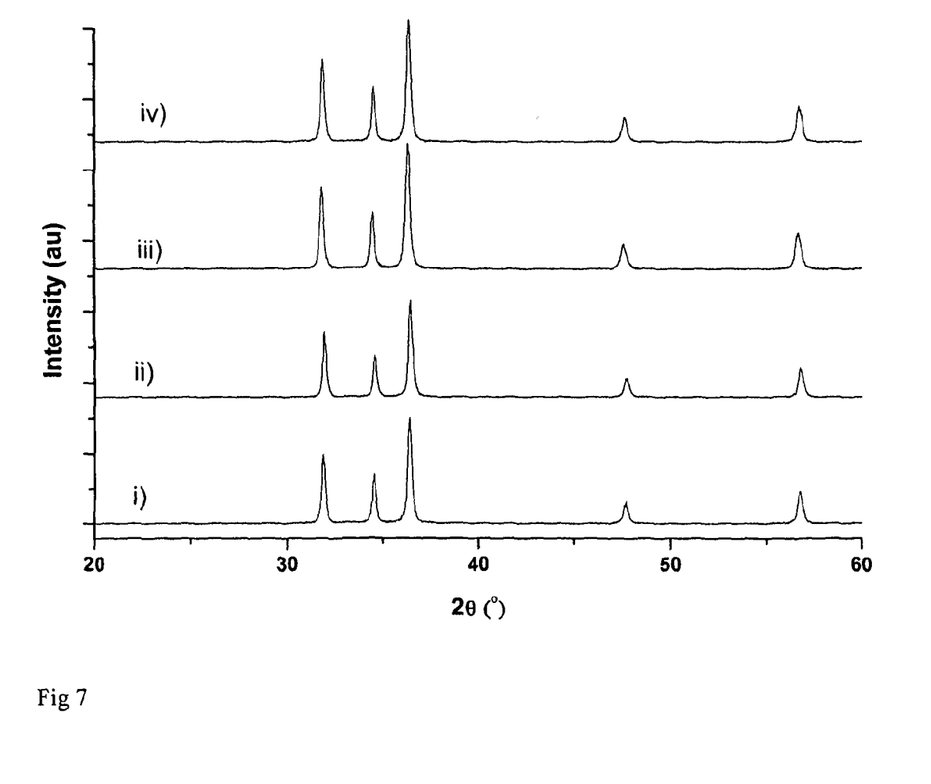

FIG. 7 shows the powder XRD patterns of ZnO synthesised under the conditions given in Table 3. The patterns obtained all show good agreement with JCPDS pattern 76-0704 [a=3.250 Å, c=5.207 Å].

Figure 8:
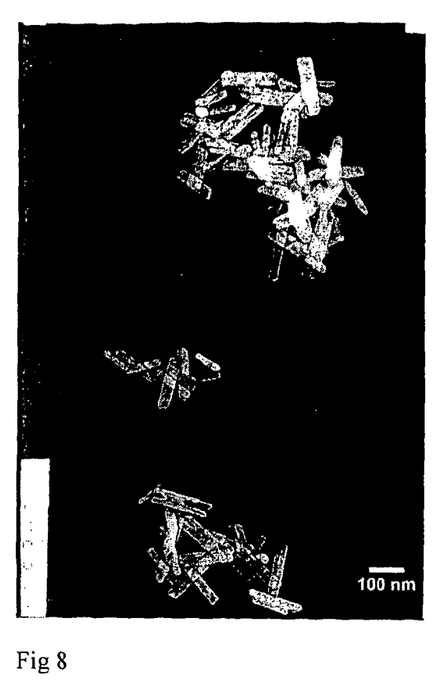
FIGS. 8 & 9 show Transmission Electron Microscope (TEM) images of the particles from the example reactions.
Figure 9:
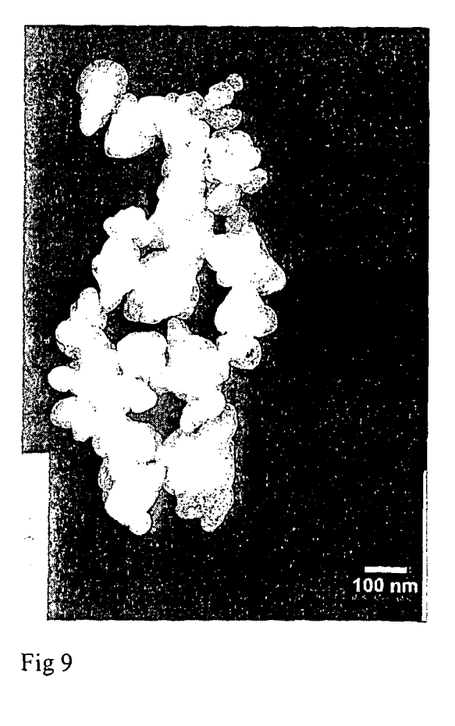

FIGS. 8 and 9 show typical images of particles of HA and ZnO, respectively, synthesised under the conditions in Table 3 then viewed under a TEM. The HA and ZnO nanoparticles synthesised showed little variation in their overall morphology irrespective of the conditions of synthesis used.

Figure 10:
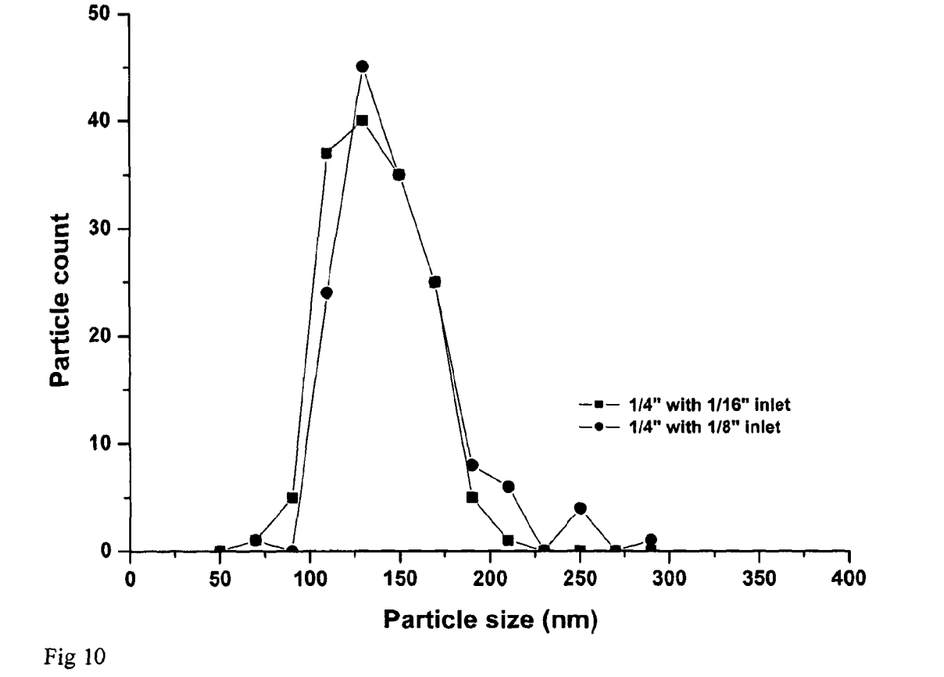
FIGS. 10 & 11 show comparative particle size distributions determined from TEM images.

FIG. 10 shows a comparison of the particle size distributions, determined from a series of TEM images, of hydroxyapatite synthesised at the conditions denoted by the roman numeral i and iii in Table 3. In this case, the appropriate size is determined along the long axis of the rod-like particles. The mean particle size is ~130 nm. There appears to be a slight broadening of the distribution of particle sizes when using a inner pipe of 1/8" OD, which may be the result of less rapid mixing.

Figure 11:
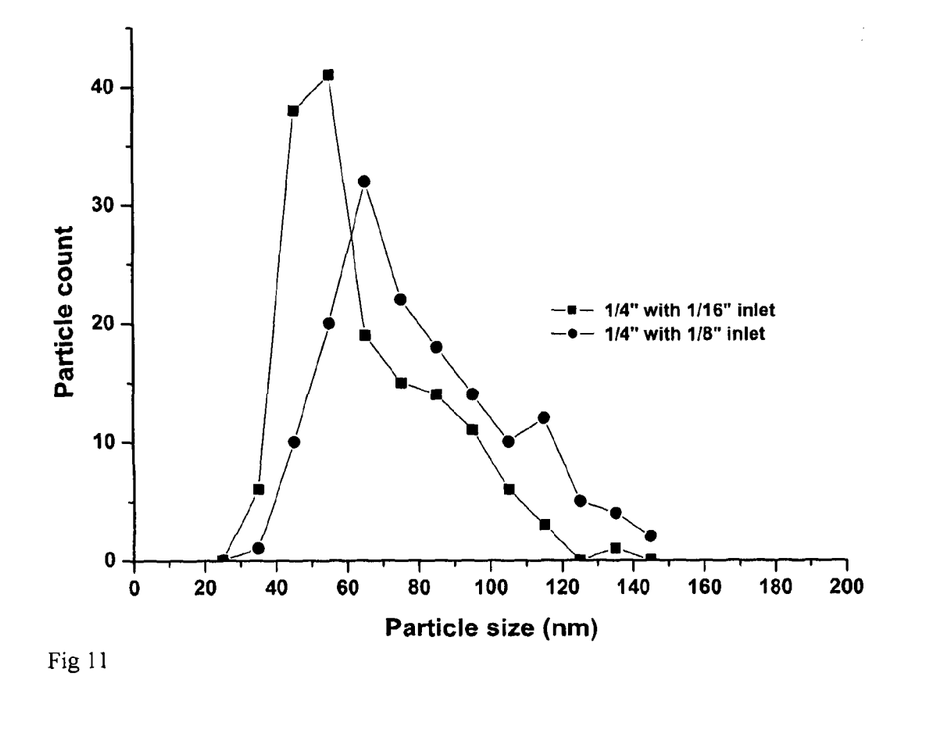

FIG. 11 shows similarly determined distributions of particle sizes of ZnO synthesised at the conditions denoted by the roman numeral i and iii in Table 3. The mean particle size is ~60 nm and the broadening of the distribution of particle sizes when using a inner pipe of 1/8" OD is more significant than for HA.

Figure 12:
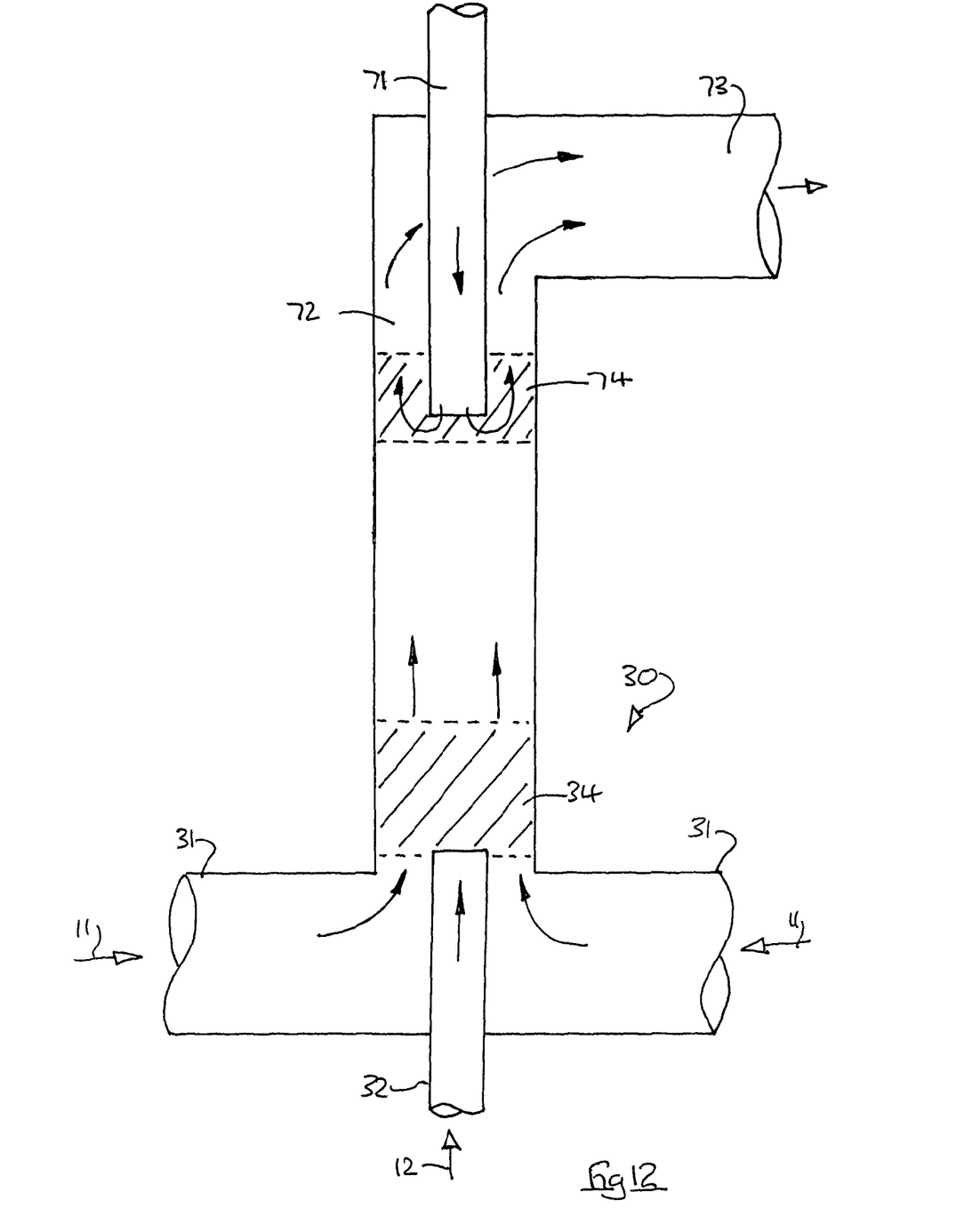
FIG. 12 illustrates schematically a modification of the mixer of FIG. 13.

FIG. 12 illustrates a modified version of the apparatus of FIG. 3 whereby a supplementary fluid feed is introduced in the outlet passage. Common parts have the same reference numerals.

With reference to FIG. 12, a third tubular inlet (71) is provided downstream of the mixing zone (34) in opposition to the outflow stream of suspended nanoparticles. This third inlet (71) defines an annular passage (72) around the circumference thereof which leads to an outlet (73). A second mixing zone (74) is created around the outlet of the third inlet, and in the annular passage (72).

The third inlet (71) allows for introduction of a quenching and/or a capping agent whereby the production of useful nanoparticles is enhanced.

In one embodiment an aqueous quenching agent is introduced via the third inlet (1) whereby the outflow from the mixing zone (34) is rapidly cooled below the temperature at which nanoparticles continue to grow in size; this temperature is about 380[deg.] at an operating pressure of about 24.1 MPa.

A rapid quench is desirable, and the skilled man will be able to select by calculation and/or empirical experiment a suitable flow volume and inlet temperature, in order to achieve the size objective. It will be understood that a water quench increases the volume of fluid at the outlet, and reduces the concentration of nanoparticles somewhat, but the advantages of a restricted size range are considerable. The skilled man will select the size of the fluid ducts according to the flow volumes, and it will be understood that FIG. 12 is illustrative. The mixing zones (34, 74) may closely approach in practice, or may merge at the adjacent boundaries.

In another embodiment the fluid from the third inlet is or includes a capping or coating agent, such as PVP or PVA, which mixes with and coats the nanoparticles so as to stabilize them and/or functionalize the particle surface.

In one example nanoparticles of magnetic iron oxides ($Fe_3O_4$) were capped with citric acid in an entirely water based process using the apparatus illustrated in FIG. 12.

The opposed inlets (31) received an aqueous solution of $Fe^{3+}$ precursor at a temperature of 20° C. and a pressure of 24.1 Mpa. De-ionised $H_2O$ was supplied at 450° C. and at the same pressure via the second inlet (32), and a nanoparticles slurry was formed in the mixing zone (34). The reaction point temperature for this reaction is about 380° C., as calculated from enthalpy balance, and direct measurement in a precursor free system.

Citric acid capping agent was fed as a water based solution via the third inlet (71) at the same pressure in a 1% by weight concentration, and the particle morphology and size distribution characterized by TEM.

Figure 13:
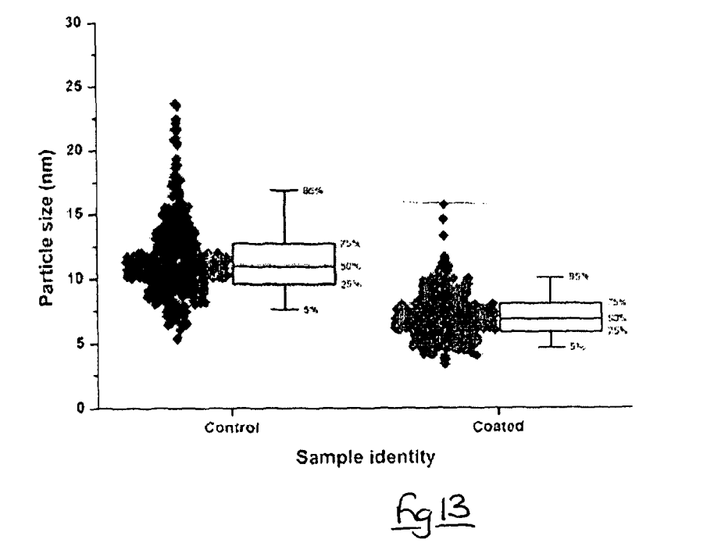

FIG. 13 shows a comparison of iron particles synthesized according to the example, and in the absence of the capping agent (control). The control comprised water at the same temperature and pressure, and thus provided a quench only.

Figure 14:
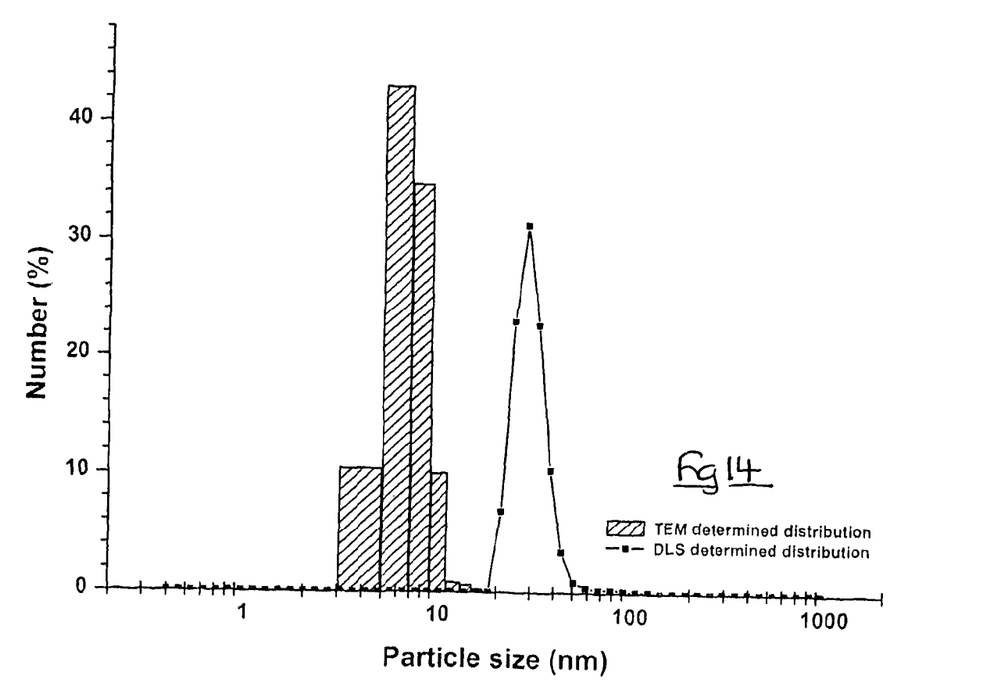

FIG. 14 shows TEM micrographs of the samples of FIG. 13, illustrating that near monodispersed and highly crystalline particles were synthesized. The coating is considered to be important in preventing agglomeration. From this plot it is clear that the coated particles have a narrow particle size band.

FIG. 14 is a comparison of hydrodynamic diameter of the particles coated according to the example, as determined by both TEM and DLS (dynamic light scattering). These measurements methods are not directly comparable, but the narrow particle size band for each method confirms close control of particle size.

The invention claimed is:

1. A method of precipitating nanoparticles in a continuous hydrothermal or solvothermal process by the mixing of a precursor, which consists essentially of an aqueous solution or suspension of solid particles for the production of nanoparticles, with a fluid for the production of nanoparticles, the fluid containing water or a mixture of water and solvents other than water and being substantially at or above the critical point of the fluid in a co-current mixer having unidirectional flow from coaxial inner and outer inlets to an outlet via a mixing zone immediately downstream of said inlets, the method comprising the steps of:
providing a fluid flow of the precursor to the outer inlet,
providing a fluid flow of the fluid to the inner inlet, and
precipitating nanoparticles by mixing of the precursor with the fluid in said mixing zone.

2. The method of claim 1, wherein the fluid flow of precursor is introduced substantially radially just upstream of said mixing zone, the fluid flow of precursor turning to the unidirectional flow direction upstream of said inner inlet.

3. The method of claim 2, wherein the fluid flow of precursor is introduced via opposed inlets.

4. A method according to claim 1, wherein the net cross-sectional area of the inner and outer inlets is approximately equal to the cross-sectional area of the outlet.

5. A method according to claim 4, wherein the outer inlet and the outlet of the co-current mixer are defined by a tube of substantially constant diameter into which is introduced a second tube defining a single inner inlet and terminating at an open mouth facing the flow direction.

6. A method according to claim 5, wherein the inner inlet comprises a tube end orthogonal to the flow direction.

7. A method according to claim 5, wherein said second tube has an insulated wall to restrict heat transfer therethrough.

8. A method according to claim 1, wherein the inner inlet is straight upstream of the mouth thereof.

9. A method according to claim 1, wherein the outer inlet has an inlet duct at the side thereof.

10. A method according to claim 9 wherein a plurality of inlet ducts is provided orthogonal to said outer inlet.

11. A method according to claim 10, wherein two opposed inlet ducts are provided.

12. A method according to claim 1, wherein the inner and outer inlets have co-extensive fluid flow in the flow direction for a distance equal to or less than the greatest transverse dimension of the outer inlet.

13. A method according to claim 12, wherein the inner and outer inlets are defined by co-axial tubes of circular cross-section.

14. A method according to claim 1, wherein the direction of fluid flow is upward.

15. A method according to claim 1, wherein the co-current mixer is adapted to withstand an internal pressure of 25 MPa in said mixing zone.

16. A method according to claim 1, wherein the co-current mixer comprises a tubular 'Tee' having opposed inlets for the precursor and wherein said 'Tee' is defined by tubes of substantially constant diameter, and said inlet for the fluid is defined by a circular tube terminating in an open mouth facing the direction of said uni-direction flow.

17. A method according to claim 16, wherein the direction of unidirectional flow is upward in use, opposing the effect of gravity.

18. A method according to claim 16, and adapted to withstand an internal pressure of 25 MPa in the mixing zone.

* * * * *